Figure 4:
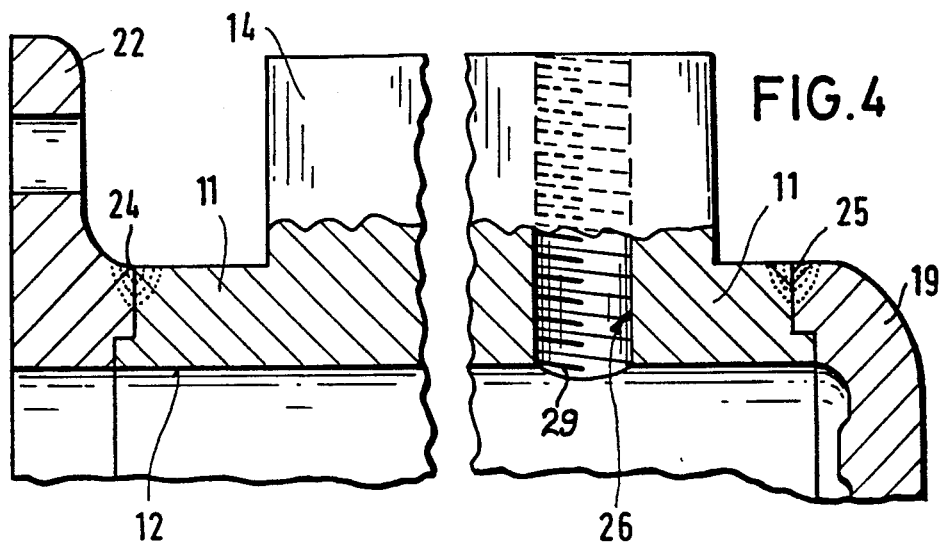

United States Patent [19]

Bloecker

[11] Patent Number: 5,319,849
[45] Date of Patent: Jun. 14, 1994

[54] METHOD OF MANUFACTURING A BRAKE CYLINDER

[76] Inventor: Detlef Bloecker, Alter Heeresweg 32, D-5330 Koenigswinter, Fed. Rep. of Germany

[21] Appl. No.: 806,510

[22] Filed: Dec. 13, 1991

[30] Foreign Application Priority Data

Dec. 20, 1990 [DE] Fed. Rep. of Germany ....... 4040881
Aug. 6, 1991 [DE] Fed. Rep. of Germany ....... 4126017

[51] Int. Cl.$^5$ .............................................. B21D 53/02
[52] U.S. Cl. .............................. 29/888.06; 29/890.09
[58] Field of Search ............... 29/888.04, 888.06, 512, 29/888, 890.05, 890.09; 72/260, 253.1

[56] References Cited

U.S. PATENT DOCUMENTS

| 2,149,072 | 2/1939 | Weatherhead et al. | 29/888.06 |
| 2,596,119 | 5/1952 | Blackman | 29/888.06 |
| 3,571,883 | 3/1971 | Doolittle | 29/888.06 X |
| 3,605,475 | 6/1979 | Eakin et al. | 72/260 X |
| 4,565,066 | 1/1986 | ITT Ind. | 60/533 |
| 4,615,098 | 10/1986 | Come et al. | 29/888.06 X |

FOREIGN PATENT DOCUMENTS 1525962 3/1967 Fed. Rep. of Germany .
2118459 12/1981 Fed. Rep. of Germany .
1511606 4/1975 United Kingdom .

OTHER PUBLICATIONS

Metall Jan. 1982 publication Dipl. Ing. G. Mier Aluminum Walzwerke Singen GmbH.

Primary Examiner—Timothy V. Eley
Assistant Examiner—Khan V. Nguyen
Attorney, Agent, or Firm—Diller, Ramik & Wight

[57] ABSTRACT

A method of manufacturing a brake cylinder. The brake cylinder is made form an extruded profile by severing a required length of profile and closing an end thereof with a cap (19). The profile consists of a cylinder jacket (11) with connection ribs (13, 14, 15) projecting therefrom a flange member (22) is fastened to the cylinder jacket (11). The bores (26) for the filling ports and the bores (27) for the pressure connections are bored into the connection ribs (13, 14, 15) radially to the cylinder jacket (11). The bores (26, 27) are also provided with female threads (29) so that respective components may be fastened to the ports and/or outlets. Producing the cylinder by extrusion provides a cylinder jacket of a surface quality high enough to make finishing superfluous.

10 Claims, 4 Drawing Sheets

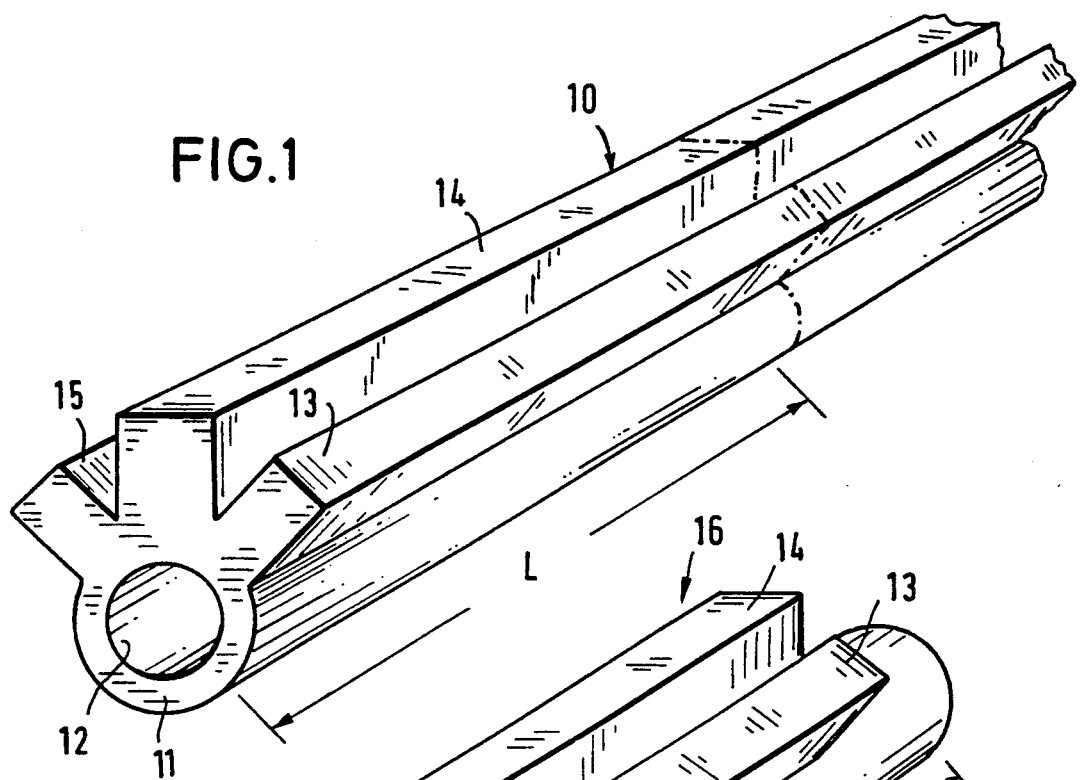
FIG.1
FIG.2
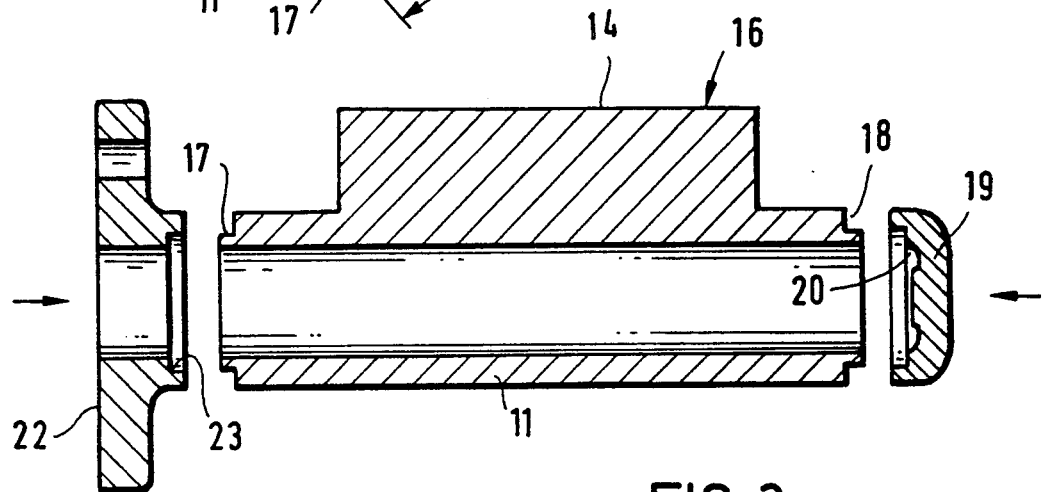
FIG.3

METHOD OF MANUFACTURING A BRAKE CYLINDER

The invention relates to a brake cylinder and to a method of producing the same.

Hydraulic brake cylinders that are produced in bulk in large quantities, generally consist of shaped bodies made by mold casting (cast iron casting or aluminium casting). Such brake cylinders have a relatively thin-walled cylinder jacket from which a plurality of filling ports and a plurality of pressure outlets protrude. Hose or pipe conduits are fastened to the filling ports and the pressure outlets Moreover, a flange is provided usually for mounting the hydraulic cylinder to a support member, for example, to the brake servo-unit of the vehicle The comparatively complicated shape of the brake cylinder requires complex and expensive production methods and molds, it being possible to use casting or drawing cores. It is also known to first make a basic body and to attach the connection sockets thereto by welding. This also requires numerous complex operations since each connection socket has to be welded on individually. Finally, the known production methods typically necessitate a very exact finishing, e.g. by fine-boring or honing, of the inner wall of the cylinder jacket along which the piston will move later on. This fine machining is time consuming and expensive.

From German Patent 21 28 459 C2, a filling cylinder for a filling injector used for filling molds with plastics powder or granulate is known, the cylinder consisting of an extruded tubular profile with external longitudinal beads in which longitudinally extending channels are provided. These channels serve to transfer pressurized air or to be provided with threaded bores for mounting connection plates. On the one hand, production in a continuous casting process does not provide the precision necessary for hydraulic cylinders, because of the thermal material contraction involved in such processes, and, on the other hand, brake cylinders have no need for continuous longitudinal channels.

It is the object of the present invention to provide a brake cylinder that allows a low-cost and simple production that requires only little effort.

The brake cylinder of the present invention consists of a profiled bar forming the cylinder jacket and a longitudinally extending connection rib and being made in an extrusion process. It is an advantage of extrusion processes that they entail low tooling costs, yet allow to produce the profiled bar so precisely that the inner wall of the cylinder jacket has an extremely high surface quality and accuracy to size. Therefore, no cutting or abrasing machining of the inner wall of the cylinder jacket is required. If necessary, a calibrating process is performed in which the profiled bar is drawn cold over a flying mandrel in order to smoothen its inner surface to a high surface quality. After the production of the profiled bar, only the bores for the pressure outlets and, if need be, for the filling ports or the vent ports have to be provided in the connection ribs. Possibly, the end of the cylinder jacket has to be closed. Machines can perform these operations very quickly and at low cost, as well as with only little technical effort.

The hydraulic cylinder can also be provided with a flange that may be welded thereto. If necessary, a part of the length of the connection ribs may be removed by cutting machining. Preferably, the hydraulic cylinder is made of an aluminium alloy.

It is an essential advantage of the present invention that the same profiled bar may be used for several types of hydraulic cylinders, the length of the hydraulic cylinder being individually selectable and also the arrangement of the ports and outlets being individually determinable. Thus, it is possible to produce a variety of different types of hydraulic cylinders, all based on the same bar profile. In contrast thereto, prior art requires a specific set of tools for each cylinder type.

Closing the end of the cylinder jacket and mounting possible further necessary components is preferably done by electron beam welding. Electron beam welding offers the advantage that the welding beam can be guided very precisely and that the welding is performed without the application of any foreign material. Further, local heat effects can be limited locally by the short weld seam so that there is no danger of a warping of the work piece or of undesired structural changes.

Figure 5:
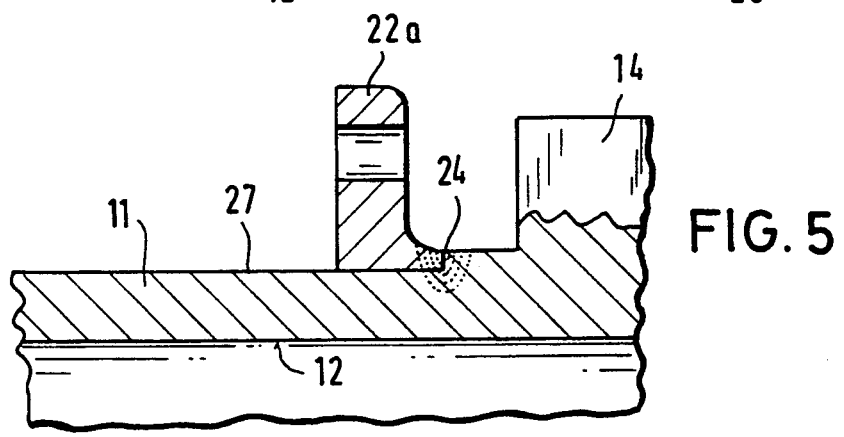
Figure 6:
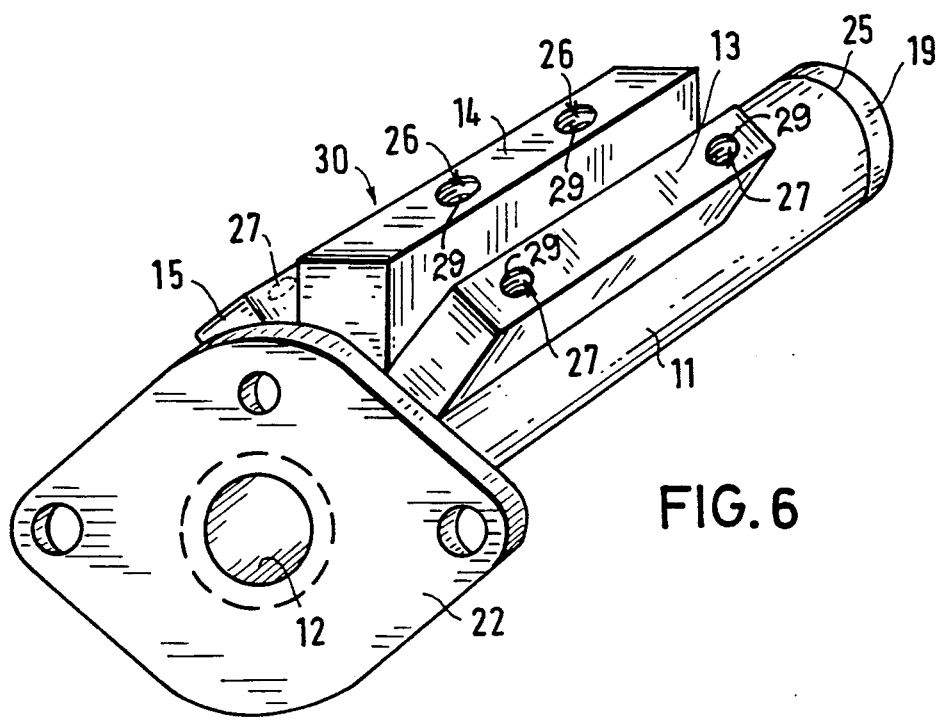
Figure 7:
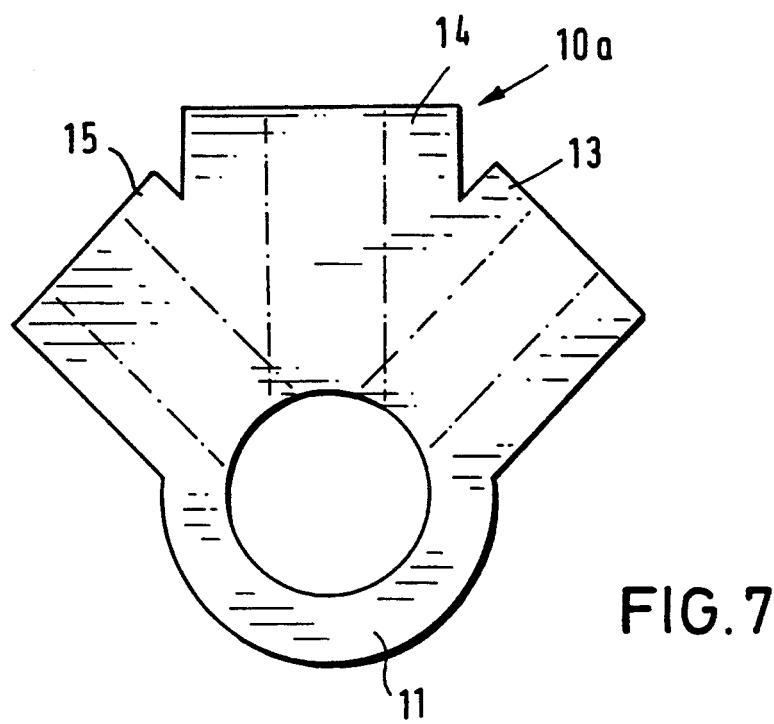
Figure 8:
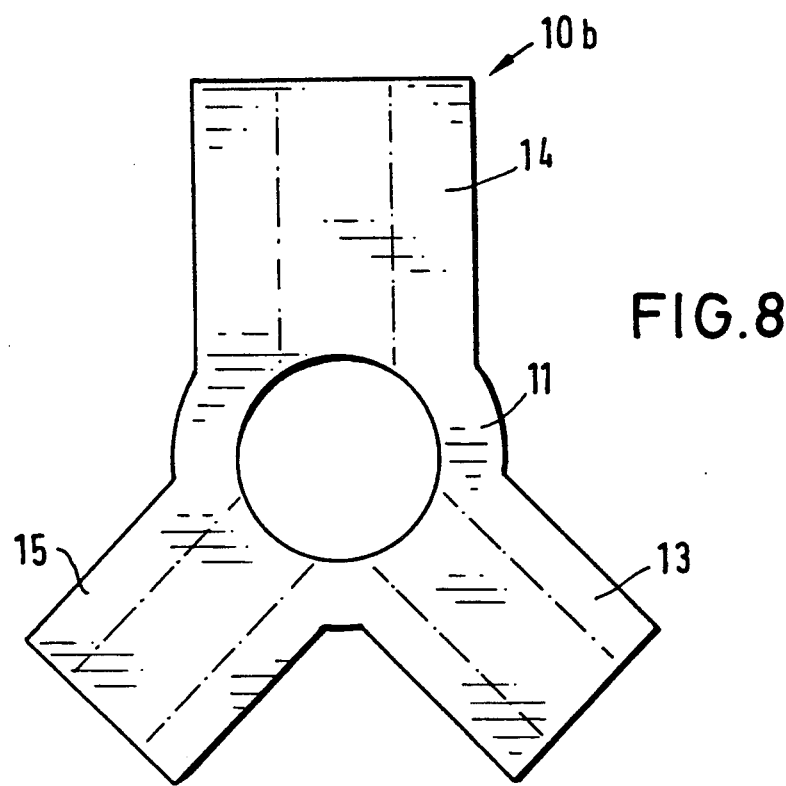
Figure 9:
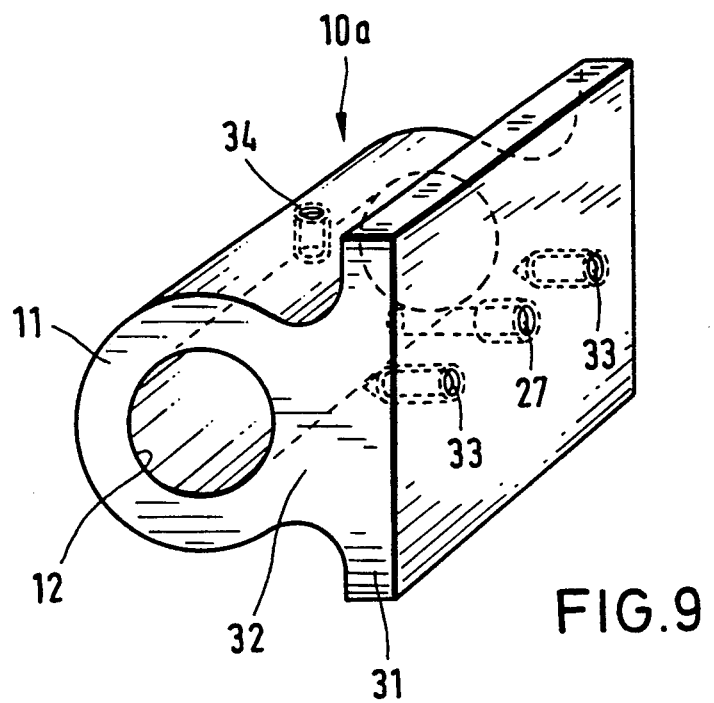

Embodiments of the present invention are described hereunder in detail with reference to the accompanying drawings, in which FIG. 1 is a profiled bar made by extrusion, FIG. 2 is a cut off length of the profiled bar as a central part of the cylinder to be made, with parts of the connection ribs also being removed, FIG. 3 is a longitudinal section of the central part of FIG. 2 upon application of an end cap and a flange, FIG. 4 is a longitudinal section after the application of the end cap and the flange, FIG. 5 illustrates another embodiment of a central part to which a flange has been fastened by electron beam welding, FIG. 6 is a perspective illustration of the completed hydraulic cylinder, FIG. 7 is a further embodiment of a profiled bar, FIG. 8 is a third embodiment of a profiled bar, and FIG. 9 is a brake cylinder suitable for use as a wheel brake cylinder.

FIG. 1 illustrates a profiled bar 10 made of an aluminium alloy in an extrusion process and having a constant and continuous profile over its entire length. The extrusion tool is a bridge-type tool wherein the mandrel for making the longitudinal channel is held centered by radial bridges Behind these bridges, the material converges again and merges. In a subsequent calibration process, the profiled bar is drawn over a flying (not fastened) calibrating mandrel to shape the inner surface 12 with a high surface quality. The profiled bar 10 consists of a cylinder jacket 11 with an exactly cylindrical inner surface 12 of high surface quality and a total of three connection ribs 13, 14, 15 projecting radially from the cylinder jacket 11. The connection ribs are of rectangular cross section and their width is larger than the material thickness of the cylinder jacket 11. In the present embodiment, all connection ribs 13, 14, 15 are arranged in the same half of the circumference of the cylinder jacket 11, i.e. the connection ribs form an essentially W-shaped configuration. In the circumferential portion of the profiled bar having no connection ribs provided thereon, the outer contour is formed by the outer surface of the cylinder jacket 11.

A length L is cut off from the profiled bar 10 and is worked upon subsequently such that the central part 16 depicted in FIG. 2 is obtained. The connection ribs have been removed for a length a at the front end and for a length b at the rear end of the central part 16, for example by machining on a lathe so that the profiled bar has cylindrical outer surfaces at these ends, respectively. Further, stepped portions 17 and 18 have been made at the ends of the central part 16 by cutting machining.

According to FIG. 3, the rear end of the cylinder jacket 11 is closed with a cap 19. This circular cap has a stepped portion 20 provided on its inside, which mates with the stepped portion 18 of the central part 16.

Similarly, a flange member 22 having a stepped portion 23 complementary to the stepped portion 17 of the cylinder jacket, is fastened to the front end of the cylinder jacket 11.

As illustrated in FIG. 4, the flange portion 22 is fastened to the front end of the cylinder jacket 11 and the cap 19 is fastened to the rear end of the cylinder jacket 11, respectively, by weld seams 24 and 25. The welding is done from outside, the welding heat thus not being able to reach the inner surface 12 of the cylinder jacket 11. The annularly extending weld seams 24 and 25 are made by electron beam welding in vacuum. The flange portion 22 and the cap 19 are made of the same aluminium alloy as the profiled bar.

Subsequent to the attaching of the flange member 22 and the cap 19, bores 26 are provided that extend radial to the cylinder jacket 11 through the respective connection rib. These bores 26 open into the interior of the cylinder jacket 11.

Whereas, in the embodiment described above, the flange member 22 has been prefixed to the cylinder jacket 11 such that the flange member elongates the inner surface 12, FIG. 5 shows an embodiment in which the flange member 22a is pushed onto a machined outer surface (unnumbered) of the cylinder jacket 11 and abuts against a stop delimiting the turned portion, at which stop the continuous weld seam 24 has been provided later on. In the final hydraulic cylinder, the flange member 22a is not located at the front end but on an intermediate portion.

FIG. 6 illustrates the final hydraulic cylinder 30, the production of which has been described with reference to FIGS. 1 to 4. The rear end of the cylinder jacket 11 is closed by the cap 19, while the flange member 22 is mounted on the front end. The piston (not illustrated) is introduced into the cylinder jacket through the opening in the flange member 22.

The remaining portions of the connection ribs 13, 14, 15 on the cylinder jacket 11 are provided with bores 26 forming the filling ports. A braking fluid reservoir may be installed on the central connection rib 14 so that braking fluid may flow into the cylinder chamber.

The bores 27 in the two outer connection ribs 13 and 15 form pressure outlets to which hoses or pipe conduits are connected leading to the individual brakes of the vehicle. All bores 26, 27 may be provided with female threads 29 so that the respective components may be fastened to the ports or outlets.

FIG. 7 shows a modified embodiment of the profiled bar 10a. In this case, the connection ribs 13, 14, 15 are so close together that they merge with each other and essentially form a uniform longitudinally extending block. When seen in front view, the bores that are later bored into the connection ribs may overlap each other since these bores are mutually offset in the longitudinal direction of the profiled rib.

A further embodiment of a profiled bar 10b is illustrated in FIG. 8. Here, the connection ribs 13, 14, 15 are arranged circumferentially about the cylinder jacket 11. The Figure shows that the arrangement of the connection ribs about the cylinder jacket 11 is not limited in any substantial way. Whereas the cylinder jacket 11 is comparatively thin, the connection ribs provide for the thickness and the depth of material necessary for the filling ports and the pressure outlets.

Usually, the main brake cylinder of a motor vehicle requires three connection ribs, each being provided with two bores corresponding to the two circuits of a dual circuits brake system. However, it is also possible to provide more or fewer connection ribs.

FIG. 9 illustrates a wheel brake cylinder used for example in drum brakes. This brake cylinder consists of a cylinder jacket 11 made from a hollow profiled bar 10a, cut to size, which has been made by extrusion and has been calibrated internally thereafter. The cylindrical inner surface 12 of the profiled bar 10a has been given a high surface quality by the calibration so that no subsequent finishing is done. Adjoining the cylinder jacket 11, the profiled bar 10a is provided with a connection rib 31 that extends approximately tangential to the cylinder jacket 11 and passes into the cylinder jacket 11 with a neck 32.

A bore 27 extends through the connection rib 31, opening substantially radially into the cylindrical inner surface 12. The bore has a thread for a pressure hose to be coupled thereto. Moreover, the connection rib 31 is provided with further fastening holes 33 parallel to the bore 27. which are also threaded and serve to fasten the brake cylinder to other parts.

The bore 27 is located approximately in the center of the length of the brake cylinder, into which area also a further bore 34 leads that is provided as a vent bore and also has a thread for a conduit to be connected thereto.

Two pistons (not illustrated) are introduced into the the longitudinal channel of the brake cylinder of FIG. 9 from opposite sides, which are pressurized from the center of the brake and which force the brake jaws apart. In such a wheel brake cylinder that is open at both ends, a filling port is not needed.

The brake cylinder of FIG. 9 is made by simply providing the bores 27, as well as 33 and 34, in the profiled bar 10a. Welding is not required at all and there is no machining of the inner surface 12 of the cylinder channel made when extruding the profiled bar.

I claim:

1. A method of producing a hydraulic cylinder having a cylinder jacket (11) closed on one side and at least one pressure connection, comprising the steps of extruding a profiled bar (10) defined by a cylinder jacket (11) and at least one substantially radially projecting longitudinally extending continuous connection rib (13, 14, 15), calibrating an inner surface (12) of the cylinder jacket (11), subsequently cutting off a predetermined length of the profiled bar, boring at least one transverse bore (26 or 27) for a pressure connection through said at least one connection rib into an interior of said cylinder jacket (11), and forming threads (29) in the bored transverse bore (26 or 27) whereby components can be threaded thereto.

2. The method of claim 1, characterized by closing one end of said cylinder jacket (11).

3. The method of claim 1, characterized by removing at least a part of of the length of said at least one connection rib (13, 14, 15).

4. The method of claim 1, characterized by fastening a flange member (22) to said cylinder jacket (11).

5. The method of claim 1, characterized by closing said end of said cylinder jacket (11) with a cap (19) fastened by electron beam welding.

6. The method of claim 1, characterized in that said connection rib (31) constitutes a mounting flange with mounting holes (33).

7. A method of producing a hydraulic cylinder component comprising the steps of extruding a one piece generally elongated member having a generally cylindrical bore defined by an axis which is generally parallel to an exterior longitudinally extending and radially outwardly projecting rib, forming a transverse bore in said rib of said member which opens into said cylindrical bore whereby said member can be subsequently utilized as a hydraulic cylinder, and forming threads in the transverse bore whereby components can be threaded thereto.

8. The method as defined in claim 7 including the step of transversely cutting a portion from said one piece elongated member.

9. The method as defined in claim 7 including the step of calibrating the cylindrical bore of said elongated member.

10. The method as defined in claim 9 including the step of calibrating the bore of the cut-off portion of the elongated member.

* * * * *